(12) United States Patent
Okubo

(10) Patent No.: US 12,462,238 B2
(45) Date of Patent: Nov. 4, 2025

(54) PRIVILEGE DISPLAY SYSTEM, PRIVILEGE DISPLAY METHOD, AND NONTRANSITORY COMPUTER-READABLE MEDIUM

(71) Applicant: SATO HOLDINGS KABUSHIKI KAISHA, Tokyo (JP)

(72) Inventor: Shinsuke Okubo, Tokyo (JP)

(73) Assignee: SATO CORPORATION, Tokyo (JP)

(*) Notice: Subject to any disclaimer, the term of this patent is extended or adjusted under 35 U.S.C. 154(b) by 254 days.

(21) Appl. No.: 17/928,576

(22) PCT Filed: Jul. 14, 2021

(86) PCT No.: PCT/JP2021/026488
§ 371 (c)(1),
(2) Date: Nov. 29, 2022

(87) PCT Pub. No.: WO2022/059323
PCT Pub. Date: Mar. 24, 2022

(65) Prior Publication Data
US 2023/0237458 A1 Jul. 27, 2023

(30) Foreign Application Priority Data
Sep. 17, 2020 (JP) .................. 2020-156673

(51) Int. Cl.
*G06Q 20/20* (2012.01)
*G06K 7/14* (2006.01)

(52) U.S. Cl.
CPC ......... *G06Q 20/208* (2013.01); *G06K 7/1413* (2013.01); *G06Q 20/206* (2013.01)

(58) Field of Classification Search
CPC ............... G06Q 20/208; G06Q 20/206; G06Q 30/0226; G06Q 30/0236; G06Q 30/0238;
(Continued)

(56) References Cited

U.S. PATENT DOCUMENTS 8,542,906 B1 * 9/2013 Persson .................. G06V 20/20
382/103
9,189,672 B2 * 11/2015 Iizaka .................... G06K 19/14
(Continued)

FOREIGN PATENT DOCUMENTS

JP    2006-215236 A    8/2006
JP    2007334715 A *   12/2007
JP      6557063 B2     8/2019

OTHER PUBLICATIONS

Hansen, Daniel Kold, et al. "Real-time barcode detection and classification using deep learning." International Joint Conference on Computational Intelligence. Scitepress Digital Library, 2017. (Year: 2017).*

*Primary Examiner* — Nathan A Mitchell
(74) *Attorney, Agent, or Firm* — Foley & Lardner LLP

(57) ABSTRACT

A privilege display system includes a storage unit that stores product ID information set for each product, additional information set for each product, and privilege information set for each additional information in association with each other; an imaging unit that acquires a video including a first code attached to the product and a second code attached to the product; a display unit that displays the video as a real-time moving image; and a processing unit that acquires the product ID information represented by the first code and the additional information represented by the second code from the video, determines a privilege based on the privilege information stored in the storage unit in association with the acquired product ID information and the acquired additional information, and displays a content of the privilege at a predetermined position with respect to the second code in the real-time moving image.

15 Claims, 10 Drawing Sheets

(58) Field of Classification Search
CPC ... G06Q 30/06; G06Q 30/0235; G06K 7/1413
See application file for complete search history.

(56) References Cited

U.S. PATENT DOCUMENTS

| | | | |
|---|---|---|---|
| 2012/0048920 A1* | 3/2012 | Iizaka | G06Q 30/0207 |
| | | | 235/375 |
| 2012/0048926 A1* | 3/2012 | Naito | G06K 7/1447 |
| | | | 235/383 |
| 2012/0136698 A1* | 5/2012 | Kent | G06Q 20/3276 |
| | | | 705/14.1 |
| 2012/0232976 A1 | 9/2012 | Calman et al. | |
| 2013/0208946 A1* | 8/2013 | Sasaki | G07G 1/0063 |
| | | | 382/103 |
| 2015/0317667 A1* | 11/2015 | Wohlert | G06Q 30/0643 |
| | | | 705/14.35 |
| 2015/0371375 A1* | 12/2015 | Tabata | G06Q 20/201 |
| | | | 382/110 |
| 2017/0109775 A1* | 4/2017 | Itahashi | G06Q 30/0239 |
| 2018/0005424 A1 | 1/2018 | Niinuma et al. | |
| 2018/0181940 A1* | 6/2018 | Fujiwara | G07G 1/145 |
| 2018/0321976 A1* | 11/2018 | Chen | H04L 67/60 |
| 2019/0266661 A1 | 8/2019 | De Sousa Moura et al. | |
| 2019/0318144 A1* | 10/2019 | Iizaka | G06Q 20/208 |
| 2020/0184170 A1* | 6/2020 | Reza | G09F 3/0291 |
| 2021/0342876 A1* | 11/2021 | Haneda | G06T 7/73 |
| 2022/0374857 A1* | 11/2022 | Nakatsukasa | A47F 9/046 |
| 2023/0013468 A1* | 1/2023 | Dai | G06T 7/254 |

* cited by examiner

| PRIVILEGE CODE | PRODUCT ID | PRODUCTION DATE | SHELF LIFE | PRODUCT CODE | PRICE | NAME |
|---|---|---|---|---|---|---|
| 1 | A01 | 2020/8/25 7:00 | 2020/8/25 19:00 | 12345 | 500 | TORIMESHI |
| 1 | A02 | 2020/8/25 7:00 | 2020/8/25 19:00 | 12345 | 500 | TORIMESHI |
| 2 | A03 | 2020/8/25 8:00 | 2020/8/25 20:00 | 12345 | 500 | TORIMESHI |
| 3 | A04 | 2020/8/25 9:00 | 2020/8/25 21:00 | 34567 | 600 | KATSUDON |
| 3 | A05 | 2020/8/25 9:00 | 2020/8/25 21:00 | 33333 | 130 | ONIGIRI |
| · · · · | · · · · | · · · · | · · · · | · · · · | · · · · | · · · · |

| PRIVILEGE CODE | 5% | 10% | 15% | 20% | |
|---|---|---|---|---|---|
| 1 | 17:00 | 17:10 | 17:20 | 17:30 | |
| 2 | 18:00 | 18:10 | 18:20 | 18:30 | |
| 3 | 19:00 | 19:10 | 19:20 | 19:30 | |
| . . . | . . . | . . . | . . . | . . . | |

15

| MEMBER ID | RANK | · · · · |
|---|---|---|
| A0001 | A | · · · · |
| A0002 | B | · · · · |
| A0003 | A | · · · · |
| A0004 | D | · · · · |
| A0005 | B | · · · · |

*FIG.5* ately attach a new label on which the content of the privilege is
PRIVILEGE DISPLAY SYSTEM, PRIVILEGE DISPLAY METHOD, AND NONTRANSITORY COMPUTER-READABLE MEDIUM

TECHNICAL FIELD

The present invention relates to a privilege display system, a privilege display method, and a program.

BACKGROUND ART

Generally, in a store such as a supermarket, a new label on which a price after discount, a discount amount, a discount rate, and the like are described is attached to a product at the time of discount of the product (see JP 2006-215236 A).

SUMMARY OF INVENTION

For example, it is conceivable to adopt the above method in giving a privilege such as a discount to a customer when a best-before date or an expiration date approaches. However, according to the above method, even if a product has been already a target of a privilege such as a discount in an accounting management system of a store, the customer cannot confirm a content of the privilege until a new label on which the content of the privilege is described is attached to the product. In addition, in a case where the discount amount is increased over time, it is necessary to attach a new label to the product every time the discount amount is changed, and thus the workload on a clerk is increased and the cost of the label is also increased.

The present invention has been made in view of such a technical problem, and an object of the present invention is to eliminate the need to attach a label on which a content of a privilege is described to a product so that a customer can confirm the content of the privilege of the product.

According to one aspect of the present invention, a privilege display system includes: a storage unit configured to store product ID information set for each product, additional information set for each product, and privilege information set for each additional information in association with each other; an imaging unit configured to acquire a video including a first code attached to the product and representing the product ID information and a second code attached to the product and representing the additional information; a display unit configured to display the video acquired by the imaging unit as a real-time moving image; and a processing unit configured to acquire the product ID information represented by the first code and the additional information represented by the second code from the video acquired by the imaging unit, determine a privilege based on the privilege information stored in the storage unit in association with the acquired product ID information and the acquired additional information, and display a content of the privilege at a predetermined position with respect to the second code in the real-time moving image.

According to the above aspect, the content of the privilege of the product is displayed at the predetermined position with respect to the second code in the real-time moving image. Therefore, the customer can confirm the content of the privilege of the product at that time only by viewing a video displayed on the display unit. Therefore, even if the label on which the content of the privilege is described is not attached to the product, the customer can confirm the content of the privilege of the product. That is, it is not necessary to attach a label on which the content of the privilege is described to the product so that the customer can confirm the content of the privilege of the product.

BRIEF DESCRIPTION OF DRAWINGS

FIG. 3 is a diagram illustrating an example of a database in which information on a product is stored.

FIG. 4 is a diagram illustrating an example of a database in which privilege information is stored.

FIG. 5 is a diagram illustrating an example of a database in which member information is stored.

DESCRIPTION OF EMBODIMENTS

Hereinafter, a privilege display system 100 according to an embodiment of the present invention will be described with reference to the accompanying drawings.

The privilege display system 100 is a system that is used in a store such as a supermarket and allows a customer to check a content of a privilege that the customer can receive at the time of accounting.

Examples of the privilege include a discount received at the time of accounting, points available at the time of accounting instead of money, points available for application to various lotteries, and the like.

Figure 1:
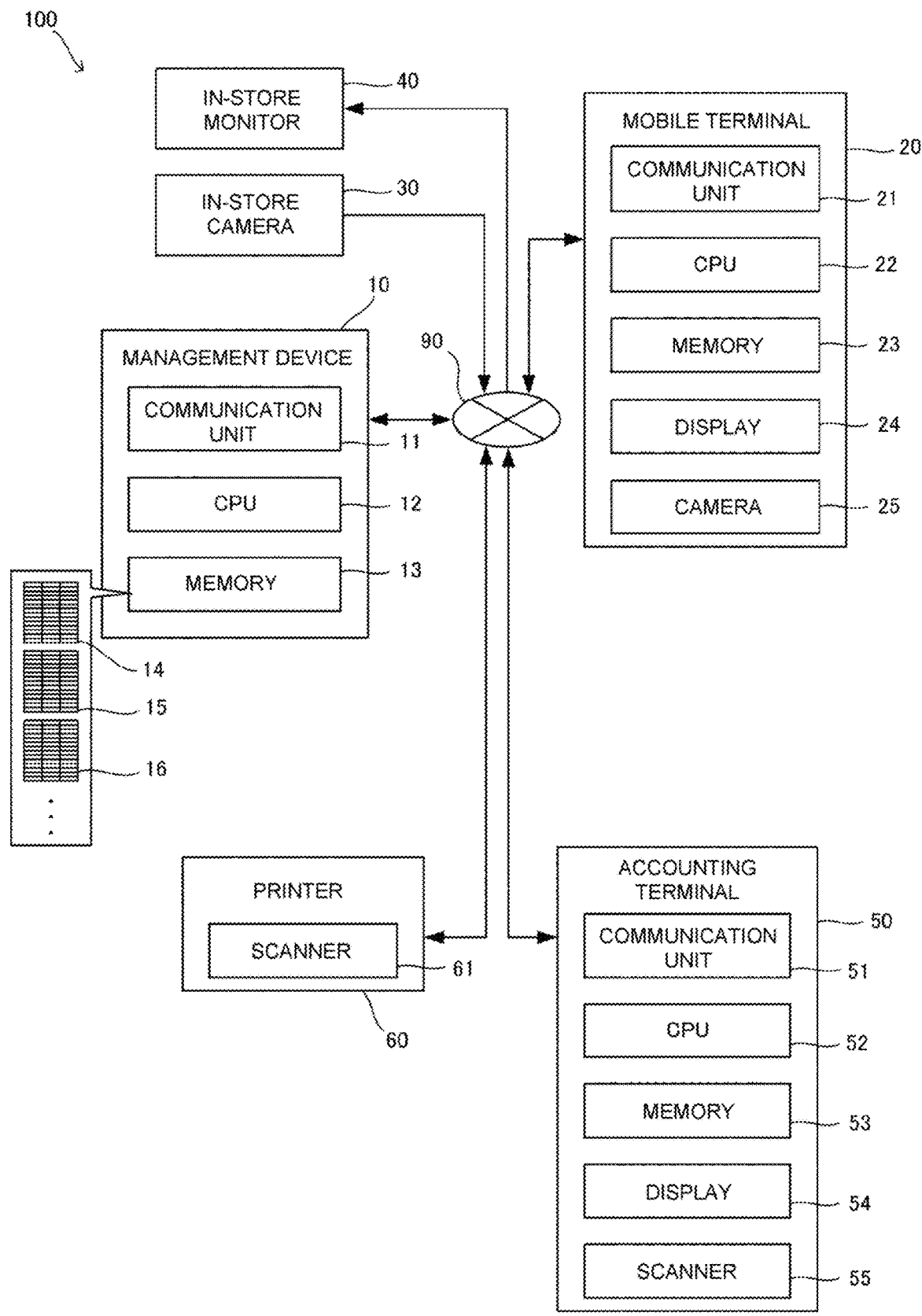
FIG. 1 is a schematic configuration diagram of a privilege display system according to an embodiment of the present invention.

A schematic configuration of the privilege display system 100 will be described with reference to FIG. 1. As shown in FIG. 1, the privilege display system 100 includes a management device 10 as a processing unit, a mobile terminal 20, an in-store camera 30 as an imaging unit, and an in-store monitor 40 as a display unit.

The mobile terminal 20, the in-store camera 30, and the in-store monitor 40 are connected to the management device 10 via a line network 90. The line network 90 is, for example, the Internet.

In the present embodiment, an accounting terminal 50 and a printer 60 are connected to the management device 10 via the line network 90. The management device 10 constitutes an accounting management system of a store together with the accounting terminal 50 and the printer 60. That is, the management device 10 of the present embodiment constitutes a part of the privilege display system 100 and also constitutes a part of the accounting management system.

The management device 10 includes a communication unit 11 for performing wired communication or wireless communication, a central processing unit (CPU) 12 that performs various types of arithmetic processing, and a memory 13 as a storage unit that stores databases 14 to 16 for storing various types of information, various programs, and the like.

The management device 10 is, for example, a computer that functions as a server, and may be provided in a cloud environment. That is, software and the databases are entities thereof. Therefore, an installation location of the management device 10 may be a virtual server that can be realized by a virtualization technique, regardless of whether the management device 10 is installed inside or outside the store. The line network 90 may be an intranet, and may also adopt a form in which the management device 10 is provided in the store.

The mobile terminal 20 is a mobile phone, a smartphone, a tablet terminal, a wearable display, or the like owned by a customer of the store.

The mobile terminal 20 includes a communication unit 21 for performing wireless communication, a CPU 22 that performs various types of arithmetic processing, a memory 23 that stores a database for storing various types of information, various types of programs, and the like, a display 24 as a display unit that displays various types of information output by the CPU 22, and a camera 25 as an imaging unit.

The mobile terminal 20 is installed with application software (hereinafter, referred to as a "store application") provided by the store side. Installation of the store application in the mobile terminal 20 is performed by a customer himself/herself in advance.

When the store application is installed in the mobile terminal 20, a member ID as customer ID information is issued from the management device 10. The member ID is a unique ID set for each customer, and no two IDs are the same.

The member ID is stored in the database 16 of the memory 13 in association with member information such as personal information and a password input by a customer when the store application is installed in the mobile terminal 20, for example. FIG. 5 is a diagram illustrating an example of the database 16 in which the member information is stored.

The store application has a function of allowing the CPU 22 of the mobile terminal 20 to execute processing of allowing the display 24 to display a member ID or a code representing the member ID, and processing of reading information represented by various codes such as a barcode or a two-dimensional code imaged by the camera 25.

The in-store camera 30 is installed in the store and transmits a captured video to the management device 10. The in-store monitor 40 is installed in the store, receives the video captured by the in-store camera 30 from the management device 10, and displays the video as a real-time moving image.

The accounting terminal 50 is a point of sales (POS) register or the like used for accounting.

The accounting terminal 50 includes a communication unit 51 for performing wired communication or wireless communication, a CPU 52 that performs various types of arithmetic processing, a memory 53 that stores a database for storing various types of information, various types of programs, and the like, a display 54 that displays various types of information output by the CPU 52, and a scanner 55 that reads information represented by a barcode.

The printer 60 includes a scanner 61 and is installed in the store. The printer 60 will be described later.

In FIG. 1, the mobile terminal 20, the in-store camera 30, the in-store monitor 40, the accounting terminal 50, and the printer 60 are each provided one, but may be provided more than one. The in-store camera 30 and the in-store monitor 40 are normally operated as a set.

Figure 2:
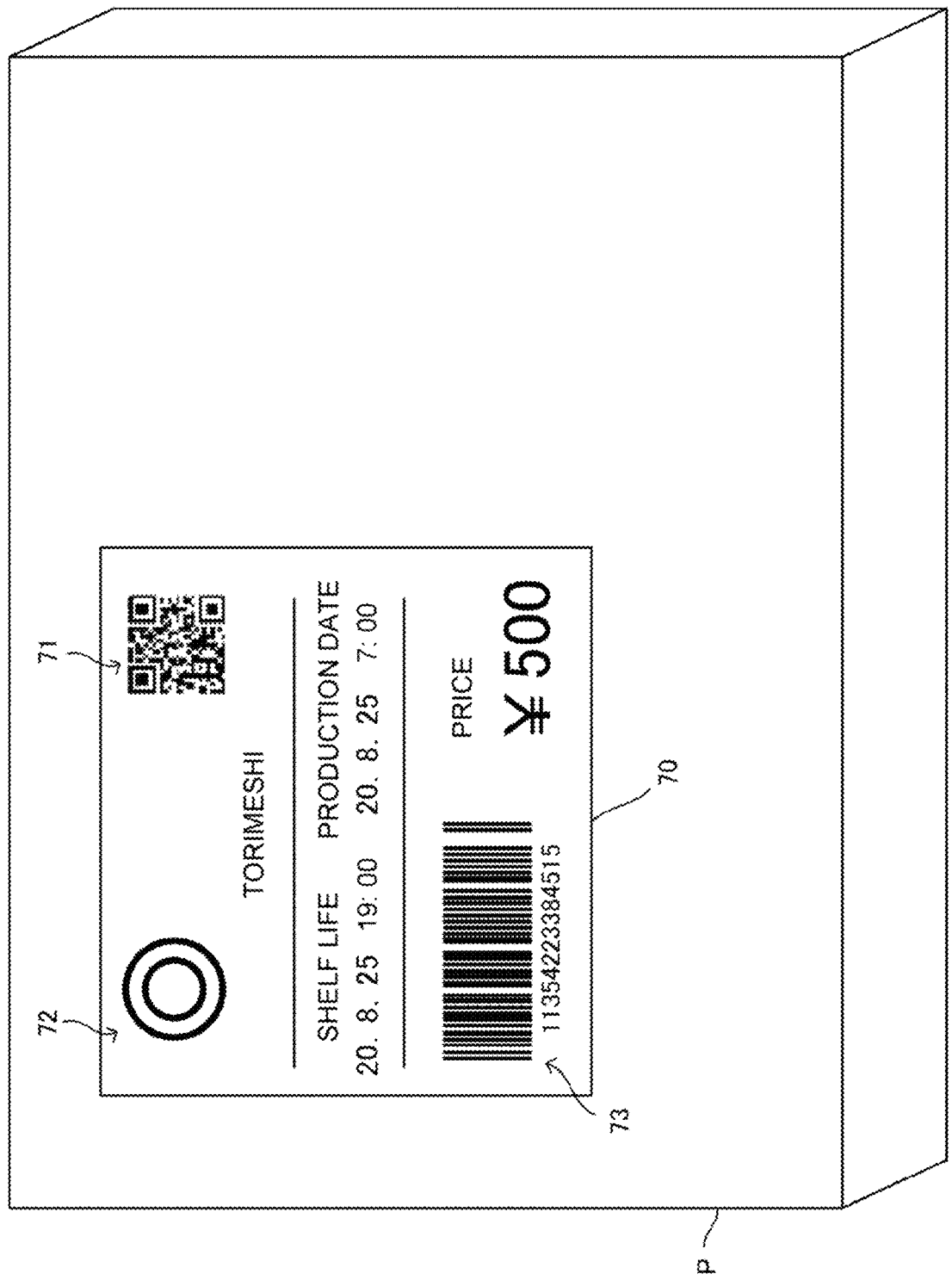
FIG. 2 is a diagram illustrating an example of a product.

Next, a product P sold in the store will be described with reference to FIGS. 2 to 4. FIG. 2 is a diagram illustrating "Torimeshi" as an example of the product P. The "Torimeshi" is a type of processed food produced in the store. FIG. 3 is a diagram illustrating an example of the database 14 in which information on the product P is stored. FIG. 4 is a diagram illustrating an example of the database 15 in which privilege information is stored.

As shown in FIG. 2, the product P is sold in a state in which a label 70 is attached.

On the label 70, a two-dimensional code 71 as a first code representing a product ID as product ID information, an augmented reality (AR) marker 72 as a second code representing a privilege code as additional information, a production date, a shelf life, a name (Torimeshi) of the product P, a barcode 73 as a third code representing a product code, and a price are printed.

The shelf life may be an expiration date or a best-before date. In addition, these may be shown together.

The product ID is a unique ID set for each product P, and no two IDs are the same. The product code is a code for specifying the product P, and the same product code is set for the same product P. The product code is, for example, a JAN code in a barcode format.

As shown in FIG. 3, the information printed on the label 70 is stored in the database 14 in association with each other.

For example, in the label 70 illustrated in FIG. 2, the product ID represented by the two-dimensional code 71 is "A01", and the privilege code represented by the AR marker 72 is "1". In this case, "A01" as the product ID, "1" as the privilege code, "2020/8/25 7: 00" as the production date, "2020/8/25/19: 00" as the shelf life, "12345" as the product code, "500" as the price, and "Torimeshi" as the name are stored in the database 14 in association with each other.

As shown in FIG. 4, the privilege code is stored in the database 15 in association with privilege information used for determining a privilege.

The privilege information includes privilege number information represented by "5%", "10%", or the like, and privilege condition information on a condition for giving a privilege represented by "17: 00", "17: 10", or the like.

The privilege information is set for each privilege code. Therefore, the same privilege information is associated with a plurality of product IDs associated with the same privilege code in the database 14.

As the AR marker 72 representing the privilege code, various marks are used in accordance with the number of patterns of the privilege information. Therefore, it is also possible to set different privilege information for all of a plurality of products P.

Any mark can function as the AR marker 72. That is, the form of the mark used as the AR marker 72 is not limited. For example, a barcode, a two-dimensional code, or other codes may be employed as the AR marker 72.

In FIG. 3, the privilege code of each of the product ID "A01" and the product ID "A02" is "1". Therefore, as shown in FIG. 4, the privilege information associated with the product ID "A01" and the product ID "A02" is "5%; 17: 00", "10%; 17: 10", "15%; 17: 20", and the like associated with the privilege code "1".

In addition, the privilege code of the product ID "A03" is "2". Therefore, the privilege information associated with the product ID "A03" is "5%; 18: 00", "10%; 18: 10", "15%; 18: 20", and the like associated with the privilege code "2".

For example, "5%; 17: 00" means that a price of the product P becomes 5% discount from an initial price after 17: 00, and "10%; 17: 10" means that the price of the product P becomes 10% discount from an initial price after 17: 10.

The privilege code may be associated with the product ID based on at least one of the production date and the shelf life of the product P.

For example, in a case where there is a possibility that the sales end early even if the product P has a long time until the shelf life, by associating the product ID with the privilege code associated with the privilege information in which the privilege to be given increases as the time elapses from the production date, the customer can easily purchase the product P early, and the stock can be rapidly reduced. In addition, by associating the product ID with the privilege code associated with the privilege information in which the privilege to be given increases as the shelf life approaches, the customer can easily purchase the product P as the shelf life approaches, and it is possible to efficiently reduce the product P to be discarded after the shelf life elapses.

The privilege information of the present embodiment is discount information received at the time of accounting. However, the privilege information may be, for example, information on points available at the time of accounting instead of money, information on points available for application to various lotteries, or the like, and may be selected by the customer or preset by the store.

As described above, in the store to which the privilege display system 100 is applied, the label 70 on which the two-dimensional code 71 and the AR marker 72 are printed is attached to the product P which is a target of the privilege.

In a case where the product P which is not the target of the privilege is changed to the target of the privilege, the label on which at least the two-dimensional code 71 and the AR marker 72 are printed may be attached to the product P later.

For example, a barcode representing a product code is attached in advance to a product P procured from the outside, and at least the product code, the price, and the name are stored in the database 14. Therefore, when the product P is changed to the target of the privilege, the privilege code and the product ID are additionally registered in the database 14. The production date and the shelf life do not necessarily need to be registered, and either or both of them are additionally registered as necessary.

In the present embodiment, the two-dimensional code 71 is employed as the first code representing the product ID. The two-dimensional code 71 can have more information than a barcode. Therefore, the two-dimensional code 71 may represent information on the production date, the shelf life, and the like, and other information in addition to the product ID. A barcode or other codes may be employed as the first code representing the product ID.

Figure 6:
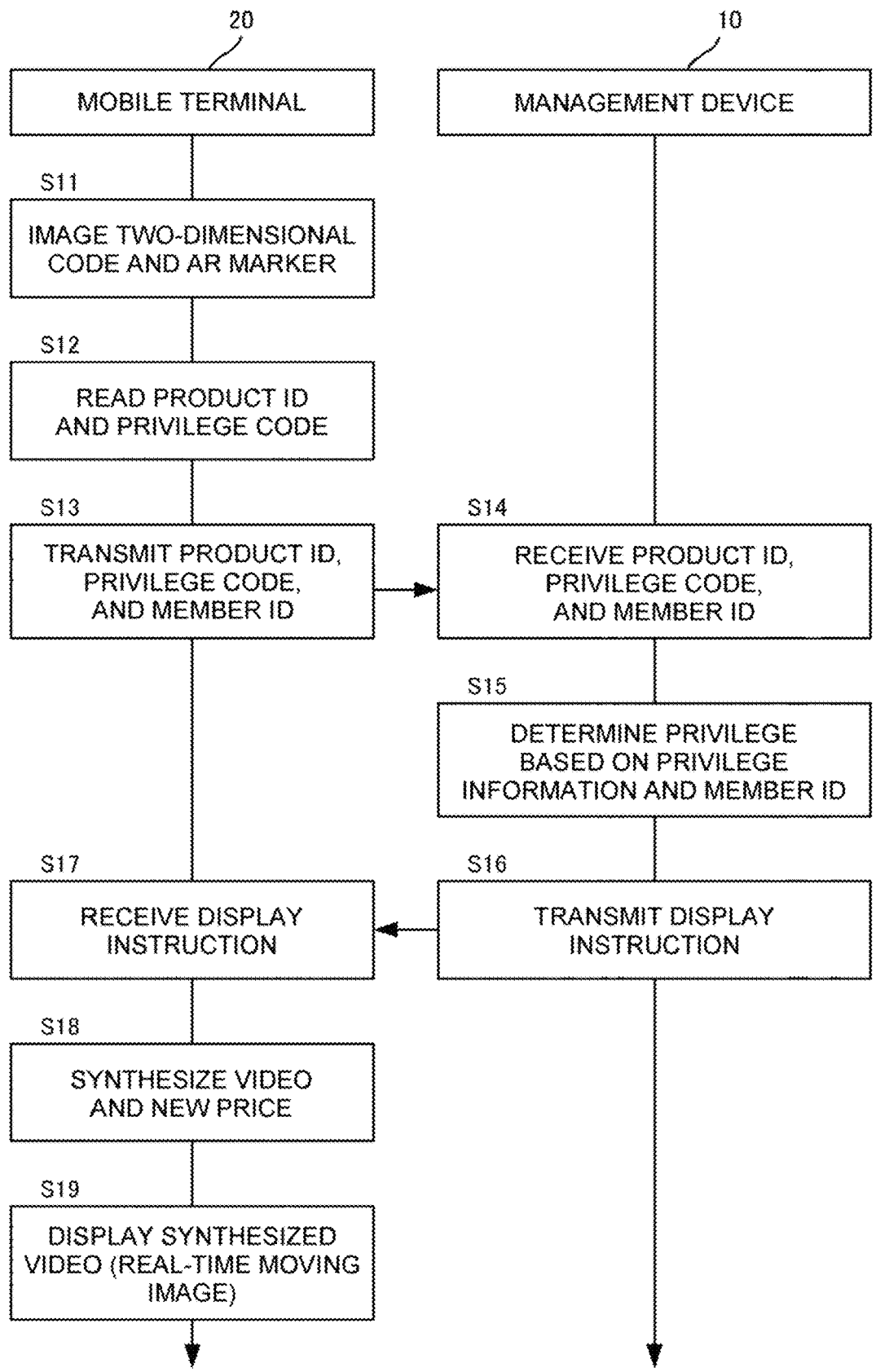
FIG. 6 is a flowchart of privilege display processing using a mobile terminal.

Next, a procedure in which the customer confirms the content of the privilege of the product P will be described with reference to FIG. 6. FIG. 6 is a flowchart illustrating privilege display processing using the mobile terminal 20.

In step S11, in a state in which the customer logs in to the store application of the mobile terminal 20, the customer uses the camera 25 to image the two-dimensional code 71 and the AR marker 72 attached to a product P for which the content of the privilege is desired to be confirmed.

The two-dimensional codes 71 and the AR markers 72 of a plurality of products P may be included in the captured video. In the store, the fact that the product P to which the AR marker 72 is attached is the target of the privilege is known to the customer by a poster or an announcement.

"Imaging" refers to acquiring a live video by the camera 25. In the privilege display system 100 of the present embodiment, when the store application of the mobile terminal 20 is logged in and the camera 25 is activated, the camera 25 is in an imaging state.

In step S12, the mobile terminal 20 (the store application) reads the product ID represented by the two-dimensional code 71 and the privilege code represented by the AR marker 72 from the captured video.

In step S13, the mobile terminal 20 (the store application) transmits the read product ID and the privilege code to the management device 10 together with the member ID.

In step S14, the management device 10 receives the product ID, the privilege code, and the member ID transmitted by the mobile terminal 20 (the store application).

In step S15, the management device 10 refers to the database 14, the database 15, and the database 16, and determines a privilege based on the privilege information and the member ID.

Hereinafter, the processing of determining the privilege will be described by taking, as an example, a case where a customer of a member ID "A0001" imaged the "Torimeshi" shown in FIG. 2 with the mobile terminal 20 at 17: 20.

In this case, the management device 10 acquires a product ID "A01", a privilege code "1", and a member ID "A0001".

The management device 10 refers to the database 14 and the database 15, and selects privilege number information based on privilege information associated with the product ID "A01" and the privilege code "1". In this example, the time is 17: 20, and the privilege condition information "17: 20" is satisfied. Therefore, the privilege number information "15%" is selected (see FIG. 4).

Next, the management device 10 refers to the database 16 and sets an upgrade of the privilege based on the member ID "A0001". The upgrade is set according to a rank stored in association with the member ID. In FIG. 4, the rank of the member ID "A0001" is "A".

The rank may be given based on, for example, the past purchase amount, the number of purchases, or the like of the customer. The higher the rank, the greater the upgrade of the privilege. As the contents of the upgrade, various contents such as an increase in a discount rate and an increase in a point granting rate can be set.

In the present embodiment, as an example of the upgrade, a discount rate of the rank "A" is set to increase by 5%, a discount rate of the rank "B" is set to increase by 3%, a discount rate of the rank "C" is set to increase by 1%, and the rank "D" is set to not upgrade.

In this case, since the rank of the member ID "A0001" is "A", the management device 10 sets "5%" (the discount rate increases by 5%) as the upgrade of the privilege. Then, the privilege number information "15%" and the upgrade "5%" are totaled to determine a final privilege. That is, the privilege is "20% discount" (15%+5%=20%).

In step S16, the management device 10 transmits, to the mobile terminal 20, a display instruction to display the content of the privilege determined in step S15 at a predetermined position in the video captured by the camera 25.

In the present embodiment, the management device 10 transmits a new price after discount to the mobile terminal 20 as the specific content of the privilege. That is, the management device 10 transmits a display instruction to the mobile terminal 20 so as to display a new price of ¥400 after the 20% discount from an initial price of ¥500.

When a price after discount has a value after a decimal point, a processing method of the value after the decimal point can be set on the store side. For example, the value after the decimal point may be rounded down, the value after the decimal point may be rounded up, or may be rounded off. It is also possible to set rounding up, rounding down, and the like for the digits of positive numbers.

In step S17, the mobile terminal 20 (the store application) receives the display instruction transmitted by the management device 10.

In step S18, the mobile terminal 20 (the store application) synthesizes a new price at the predetermined position in the video captured by the camera 25. In the present embodiment, the predetermined position is a position that coincides with the AR marker 72. The predetermined position can be freely set with reference to a position of the AR marker 72.

In step S19, the mobile terminal 20 (the store application) displays a video synthesized with the new price in step S18 on the display 24.

In a case where the two-dimensional codes 71 and the AR markers 72 of the plurality of products P are included in the video captured in step S11, the processing of steps S12 to S19 is executed for all the two-dimensional codes 71 and the AR markers 72.

Through the above processing, a video in which the new price after discount is synthesized at a position coinciding with the AR marker 72 is displayed on the display 24 of the mobile terminal 20 as a real-time moving image.

Figure 7:
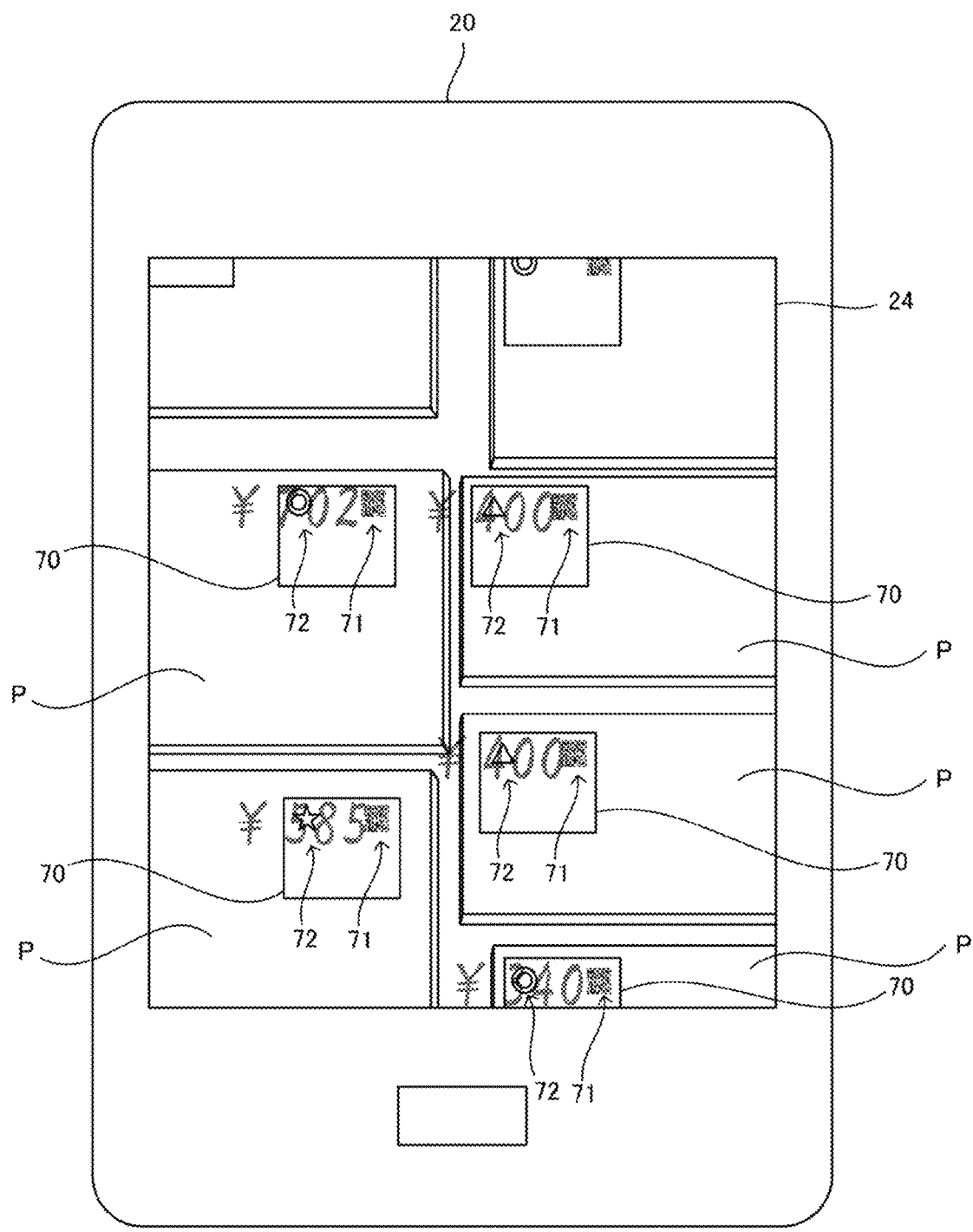
FIG. 7 is a diagram for explaining a video displayed on a display of the mobile terminal.

FIG. 7 is a diagram for explaining the video displayed on the display 24 of the mobile terminal 20. In FIG. 7, the description on the label 70 is partially omitted. The same applies to FIGS. 8 and 9 to be described later.

In FIG. 7, two-dimensional codes 71 and AR markers 72 of five products P are imaged by the camera 25. A new price after discount is displayed as the content of the privilege at a position coinciding with each of the five AR markers 72.

For example, regarding a product P in which "k" is printed on the label 70 as the AR marker 72, "Y585" is displayed as a new price after discount at a position coinciding with the AR marker 72.

In addition, the management device 10 has a function (a sorting function and a search function) of displaying a name of the product P on the display 24 in accordance with a predetermined rule in a state in which the camera 25 acquires the video including the two-dimensional code 71 and the AR marker 72 of the product P.

Figure 8:
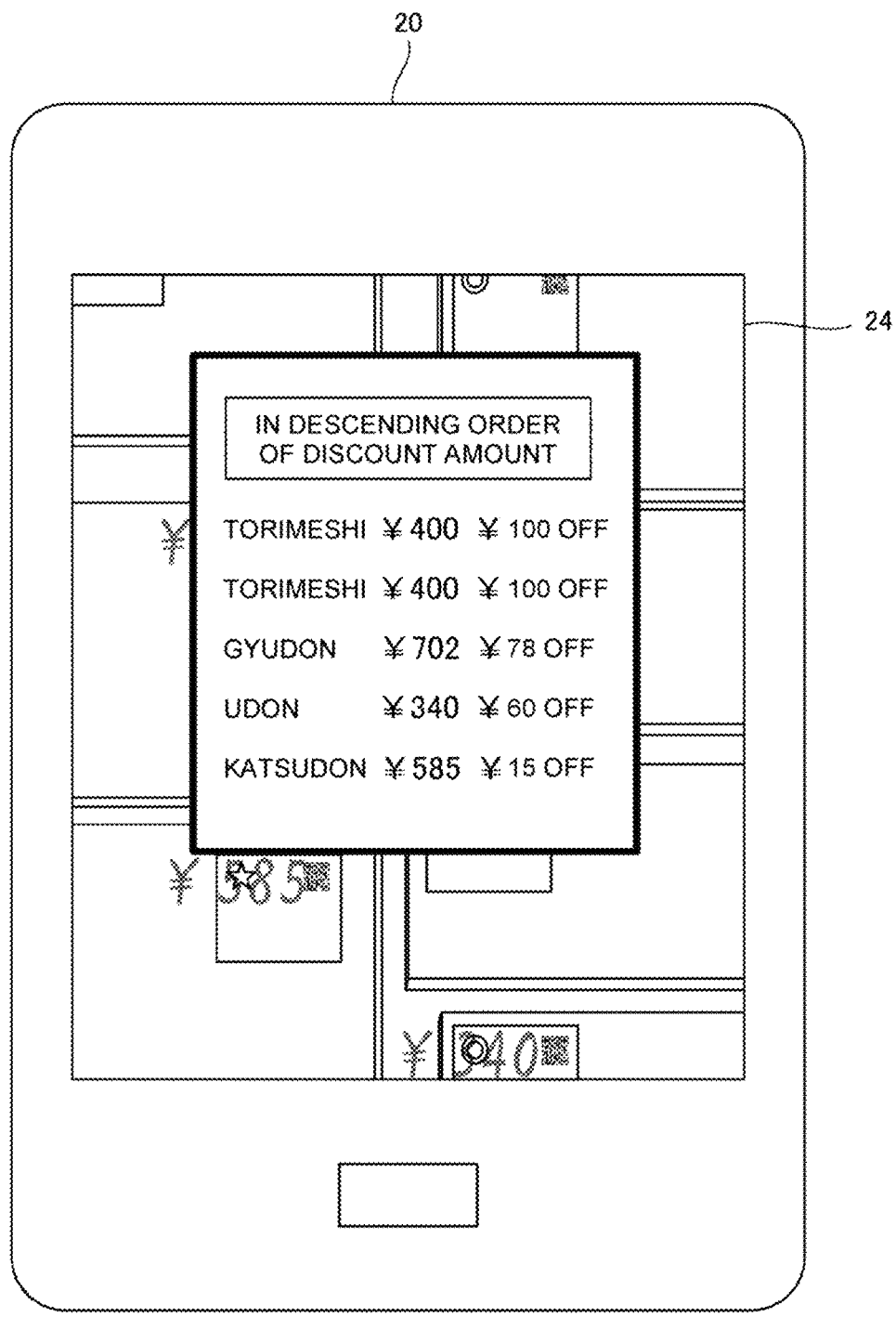
FIG. 8 is a diagram for explaining a sorting function.

FIG. 8 is a diagram for explaining the sorting function.

In FIG. 8, two-dimensional codes 71 and AR markers 72 of five products P which are the same as those in FIG. 7 are imaged, and names of the five products P are displayed from the top in descending order of discount amount by the sorting function. Specifically, "Torimeshi", "Torimeshi", "Gyudon", "Udon", and "Katsudon" are displayed in this order.

That is, the predetermined rule in the sorting function is a display order rule in a case where names of a plurality of products P are displayed.

Specifically, in an example illustrated in FIG. 8, a rule for displaying names of products P in descending order of discount amount is applied, and prices and discount amounts are displayed in addition to the names of the products P.

As the predetermined rule in the sorting function, various rules can be set, such as a rule for displaying the names of the products P in descending order of discount rate and a rule for displaying the names of the products P in ascending order of price.

The customer can set which rule is applied among various rules by using a setting function of the store application. In addition, the customer can set which item is displayed in addition to the name of the product P by using the setting function of the store application.

Figure 9:
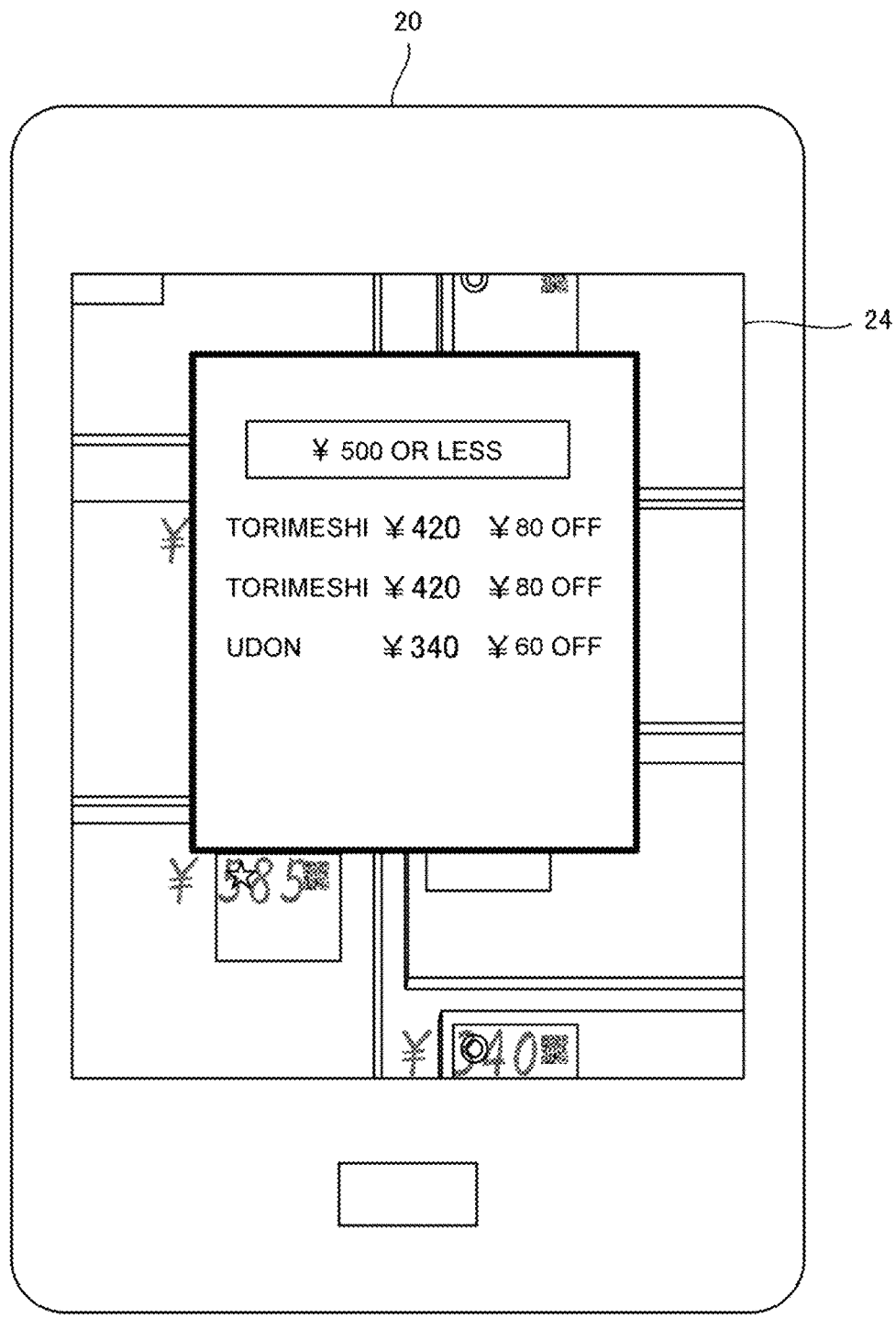
FIG. 9 is a diagram for explaining a search function.

FIG. 9 is a diagram for explaining the search function.

In FIG. 9, two-dimensional codes 71 and AR markers 72 of five products P which are the same as those in FIG. 7 are imaged, and names of the products P whose prices are Y500 or less are displayed from the top in descending order of price by the search function. Specifically, "Torimeshi", "Torimeshi", and "Udon" are displayed in this order.

That is, the predetermined rule in the search function is a rule for displaying a name of a specific product P retrieved from the plurality of products P.

Specifically, in an example illustrated in FIG. 9, a rule for displaying names of products P whose prices are Y500 or less in descending order of price is applied, and prices and discount amounts are displayed in addition to the names of the products P.

Also in the search function, the customer can set which rule is applied among various rules by using the setting function of the store application. In addition, the customer can set which item is displayed in addition to the name of the product P by using the setting function of the store application.

As described above, according to the privilege display system 100, the customer can confirm the content of the privilege of the product P using the portable terminal 20 owned by the customer.

Further, in the privilege display system 100, the content of the privilege of the product P can be displayed on the in-store monitor 40 by using the in-store camera 30 and the in-store monitor 40. Accordingly, a customer who does not own the mobile terminal 20 can also confirm the content of the privilege of the product P.

Figure 10:
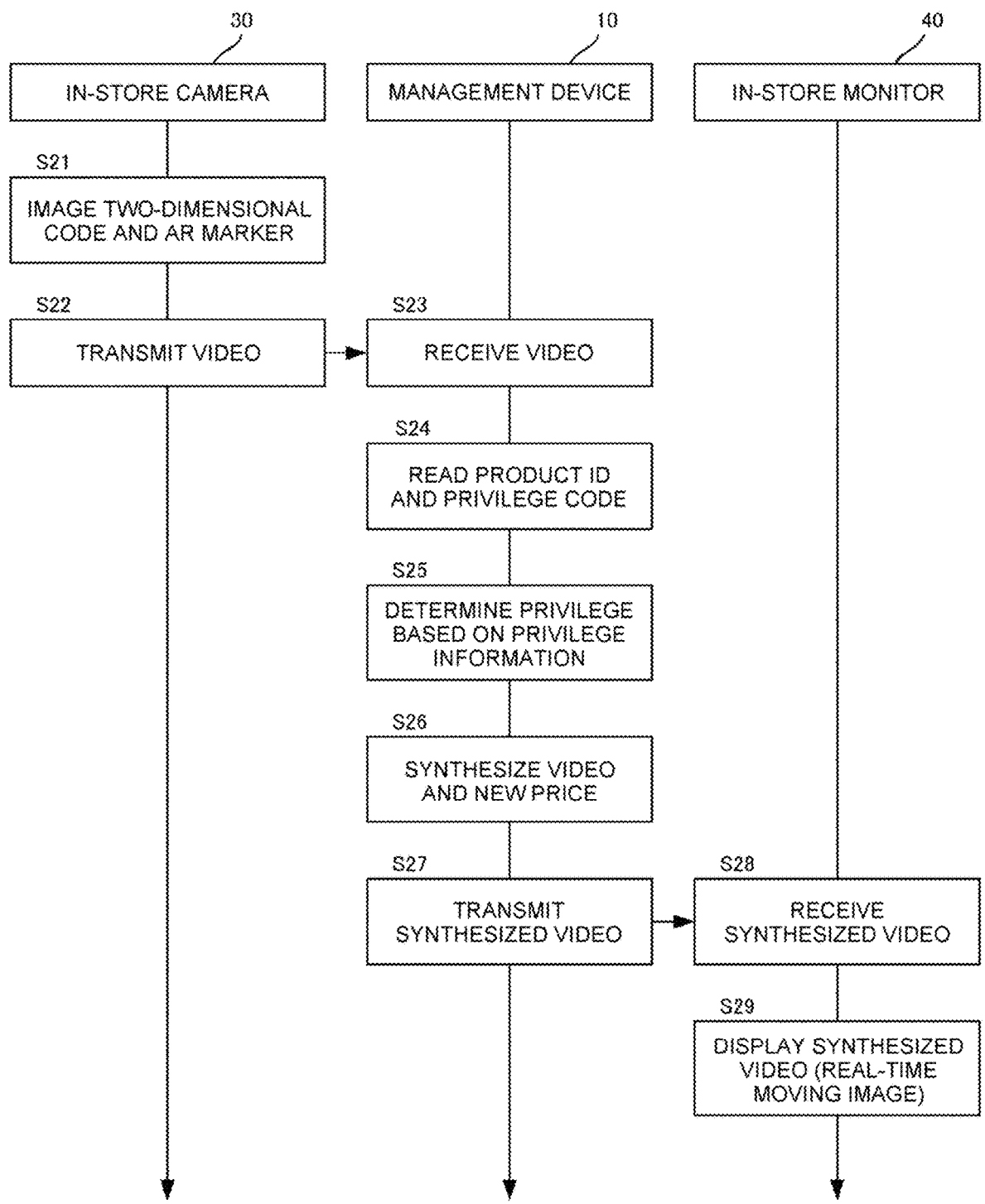
FIG. 10 is a flowchart of privilege display processing using an in-store camera and an in-store monitor.

Hereinafter, a case where the in-store camera 30 and the in-store monitor 40 are used will be described with reference to FIG. 10. FIG. 10 is a flowchart of privilege display processing using the in-store camera 30 and the in-store monitor 40.

In step S21, the in-store camera 30 installed in the store images the two-dimensional code 71 and the AR marker 72 attached to the product P.

For example, the in-store camera 30 may be placed so as to image many products P displayed in a processed food corner, or may be placed so as to image many products P displayed in a fresh food corner.

Unlike the case of the mobile terminal 20, the customer cannot select a target to be imaged by the in-store camera 30. Therefore, it is preferable to image as many products P as possible within a range in which the products P can be discriminated on the video.

"Imaging" refers to acquiring a live video by the in-store camera 30.

In step S22, the in-store camera 30 transmits a captured video to the management device 10.

In step S23, the management device 10 receives the video transmitted by the in-store camera 30.

In step S24, the management device 10 reads a product ID represented by the two-dimensional code 71 and a privilege code represented by the AR marker 72 from the received video.

In step S25, the management device 10 refers to the database 14 and the database 15, and determines a privilege based on the privilege information.

Hereinafter, the processing of determining the privilege will be described by taking, as an example, a case where "Torimeshi" shown in FIG. 2 was imaged by the in-store camera 30 at 17: 20.

In this case, the management device 10 acquires a product ID "A01" and a privilege code "1".

The management device 10 refers to the database 14 and the database 15, and selects the privilege number information based on the privilege information associated with the product ID "A01" and the privilege code "1". In this example, the time is 17: 20, and the privilege condition information "17: 20" is satisfied. Therefore, the privilege number information "15%" is selected (see FIG. 4).

Here, in the privilege display processing using the in-store camera 30 and the in-store monitor 40, unlike the case of using the mobile terminal 20, the member ID is not considered. Therefore, the management device 10 sets the privilege number information "15%" as a final privilege as it is. That is, in this case, the management device 10 determines that the privilege is "15% discount".

In step S26, the management device 10 synthesizes the content of the privilege at a predetermined position with respect to the AR marker 72 in the video captured by the in-store camera 30. In the present embodiment, the predetermined position is a position that coincides with the AR marker 72. The predetermined position can be set freely.

In the present embodiment, the management device 10 synthesizes a new price after discount with the video as a specific content of the privilege. That is, the management device 10 synthesizes Y425 after the 15% discount from an initial price of Y500 with the video as a new price.

In step S27, the management device 10 transmits a video synthesized with the new price to the in-store monitor 40.

In step S28, in-store monitor 40 receives the video transmitted by management device 10.

In step S29, in-store monitor 40 displays the video received from management device 10.

In a case where two-dimensional codes 71 and AR markers 72 of a plurality of products P are included in the video captured in step S21, the processing of steps S24 to S26 is executed for all the two-dimensional codes 71 and the AR markers 72.

Through the above processing, a video in which the new price after discount is synthesized at a position coinciding with the AR marker 72 is displayed on the in-store monitor 40 as a real-time moving image.

As described above, the member ID is not considered in the privilege display processing using the in-store camera 30 and the in-store monitor 40. Therefore, the content of the privilege displayed on the in-store monitor 40 does not include the upgrade of the privilege based on the member ID.

Next, a procedure in which the customer receives the privilege of the product P will be described.

The customer reads the two-dimensional code 71 attached to the product P with the scanner 61 of the printer 60.

Here, when the customer owns the mobile terminal 20, a code representing a member ID is displayed on the display 24 of the mobile terminal 20 by the store application, and the code is read by the scanner 61 together with the two-dimensional code 71.

The printer 60 transmits the product ID and the member ID read from the two-dimensional code 71 to the management device 10. When the member ID is not scanned by the scanner 61, only the product ID is transmitted to the management device 10.

When the management device 10 receives the product ID and the member ID, the management device 10 determines the privilege based on the privilege information associated with the product ID and the member ID, and transmits a print instruction for printing the content of the privilege to the printer 60.

When the management device 10 receives only the product ID, the management device 10 determines the privilege based on the privilege information associated with the product ID, and transmits a print instruction for printing the content of the privilege to the printer 60.

The printer 60 issues a label on which the content of the privilege is printed in accordance with the print instruction received from the management device 10. For example, if the privilege is a 10% discount, a discount label on which characters of "10% discount" and a barcode representing a new price after the 10% discount are printed is issued.

The customer himself/herself attaches the discount label issued from the printer 60 to the product P.

Thereafter, the customer performs accounting of the product P. When the barcode printed on the discount label is read by the scanner 55 of the accounting terminal 50, the product P can be purchased at a price after 10% discount.

As described above, the privilege display system 100 of the present embodiment includes: the memory 13 that stores the product ID set for each product P, the privilege code set for each product P, and the privilege information set for each privilege code in association with each other; an imaging unit that acquires the video including the two-dimensional code 71 attached to the product P and representing the product ID and the AR marker 72 attached to the product P and representing the privilege code; a display unit that displays the video acquired by the imaging unit as a real-time moving image; and the management device 10 that acquires the product ID represented by the two-dimensional code 71 and the privilege code represented by the AR marker 72 from the video acquired by the imaging unit, determines a privilege based on the privilege information stored in the memory 13 in association with the acquired product ID and privilege code, and displays the content of the privilege at a predetermined position with respect to the AR marker 72 in the real-time moving image.

The imaging unit is the camera 25 of the mobile terminal 20, and the display unit is the display 24 of the mobile terminal 20.

Accordingly, the content of the privilege of the product P is displayed at the predetermined position with respect to the AR marker 72 in the real-time moving image. Therefore, the customer can confirm the content of the privilege of the product P at that time only by viewing the video displayed on the display 24 of the mobile terminal 20. Therefore, even if a label on which the content of the privilege is described is not attached to the product P, the customer can confirm the content of the privilege of the product P. That is, it is not necessary to attach a label on which the content of the privilege is described to the product P so that the customer can confirm the content of the privilege of the product P. In other words, it is possible to reduce the number of labels and man-hours for attaching steps.

For example, in a case where the discount amount is increased over time, when a new label is attached to the product P every time the discount amount is changed, the workload on a clerk is increased and the cost of the label is also increased. On the other hand, according to the privilege display system 100 of the present embodiment, it is possible to reduce the workload on a clerk and suppress the cost of the label.

A plurality of product IDs associated with the same privilege code have the same associated privilege information.

Accordingly, it is possible to reduce the man-hours and data amount for setting the privilege information.

The memory 13 stores the member ID, and the management device 10 acquires the member ID from the mobile terminal 20 and determines the privilege based on the privilege information and the member ID.

Accordingly, it is possible to optimize the privilege according to the customer. Therefore, customer satisfaction can be improved.

The memory 13 stores the name of the product P in association with the product ID, and the management device 10 displays the name of the product P on the display 24 in a state in which the camera 25 acquires the video including the two-dimensional code 71 and the AR marker 72 of the product P.

Accordingly, the customer can easily recognize the product P displayed on the display 24.

The management device 10 displays the name of the product P on the display 24 according to a predetermined rule.

The predetermined rule may be a display order rule in a case where names of a plurality of products P are displayed.

Accordingly, the customer can determine the order of priority and select the product P.

The predetermined rule may be a rule for displaying a name of a specific product P retrieved from the plurality of products P.

Accordingly, the customer can find the product P satisfying a desired condition.

The imaging unit may be the installed in-store camera 30, and the display unit may be the installed in-store monitor 40.

Accordingly, a customer who does not own the mobile terminal 20 can also confirm the content of the privilege of the product P.

The first code may be the two-dimensional code 71.

The two-dimensional code 71 can have more information than a barcode. Therefore, the two-dimensional code 71 may represent information on the production date, the shelf life, and the like, and other information in addition to the product ID.

The second code may be the AR marker 72.

Accordingly, the customer can easily recognize the product P which is the target of the privilege.

Although the embodiment of the present invention has been described above, the above embodiment merely exemplifies one application example of the present invention, and does not intend to limit the technical scope of the present invention to the specific configuration of the above embodiment.

For example, in the above embodiment, the privilege display system 100 may implement both the privilege display processing using the mobile terminal 20 and the privilege display processing using the in-store camera 30 and the in-store monitor 40. However, the privilege display system 100 may implement only the privilege display processing using the in-store camera 30 and the in-store monitor 40 without using the mobile terminal 20, or may implement only the privilege display processing using the mobile terminal 20 without using the in-store camera 30 and the in-store monitor 40.

In the above embodiment, the case where the management device 10 is an execution subject of the privilege display processing using the mobile terminal 20 has been described. However, it is also possible to adopt a configuration in which the mobile terminal 20 bears a part or all of the functions of executing the privilege display processing using the mobile terminal 20. The same applies to an execution subject of the sorting function and the search function.

In the above embodiment, in step S15 of the privilege display processing using the mobile terminal 20, the privilege is determined based on the privilege information and the member ID. However, the member ID may not be considered. That is, the privilege may be determined based on the privilege information.

In the above embodiment, various types of information are stored in the database 14, the database 15, and the database 16. However, the number of databases and the setting as to which information is stored in the databases can be changed as appropriate.

In the above embodiment, the aspect in which the management device 10 constitutes a part of the privilege display system 100 and constitutes a part of the accounting management system has been described. However, the accounting management system may include a dedicated management device separate from the management device 10.

As the various programs executed by the privilege display system 100, those stored in a non-transient recording medium such as a CD-ROM may be used.

The present application claims priority under Japanese Patent Application No. 2020-156673 filed to the Japan Patent Office on Sep. 17, 2020, and an entire content of this application are incorporated herein by reference.

The invention claimed is:

1. A privilege display system comprising:
   a storage unit configured to store product ID information for each product, additional information for each product, and privilege information in association with the product ID information and the additional information, wherein:
   the product ID information includes a set of unique product IDs, each of which corresponds to an individual product so that no identical product IDs exist for the same type of product, and
   the additional information includes a product code that specifies the product, wherein the product code is different from the product ID in that the product code corresponds to a product group of the same type of products;
   an imaging unit configured to acquire a video including a first code attached to the product and corresponding to the product ID information and a second code attached to the product and corresponding to the additional information;
   a display unit configured to display the video acquired by the imaging unit as a real-time moving image; and
   a processing unit configured to acquire the product ID information corresponding to the first code and the additional information corresponding to the second code from the video acquired by the imaging unit, determine a privilege based on the privilege information stored in the storage unit in association with the acquired product ID information and the acquired additional information, and display a content of the privilege at a predetermined position with respect to the second code in the real-time moving image.

2. A privilege display system comprising:
   a storage unit configured to store unique product ID information for each product, additional information for each product, and privilege information in association with the unique product ID information and the additional information, wherein the product ID information includes a set of unique product IDs, each of which corresponds to an individual product so that no identical product IDs exist for the same type of product;
   an imaging unit configured to acquire a video including a code corresponding to the product ID information;
   a display unit configured to display the video acquired by the imaging unit as a real-time moving image; and a processing unit configured to acquire, from the video acquired by the imaging unit, the additional information that is associated with the product ID information corresponding to the code, and determine a privilege based on the privilege information stored in the storage unit in association with the acquired additional information, and display a content of the privilege at a predetermined position in the real-time moving image.

3. The privilege display system according to claim 2, wherein
the additional information includes a product code that specifies the product, wherein the product code is different from the product ID in that the product code corresponds to a product group of the same type of products, and
a plurality of unique product IDs associated with the same product code have the same associated privilege information.

4. The privilege display system according to claim 2, wherein
the imaging unit is a camera of a mobile terminal, and
the display unit is a display of the mobile terminal.

5. The privilege display system according to claim 4, wherein
the storage unit is configured to store customer ID information, and
the processing unit is configured to acquire the customer ID information from the mobile terminal and determine the privilege based on the privilege information and the customer ID information.

6. The privilege display system according to claim 4, wherein
a first code corresponding to the product ID information and a second code corresponding to the additional information are attached to the product,
the imaging unit is configured to acquire the video including the first code and the second code,
the storage unit is configured to store a name of the product in association with the product ID information, and
the processing unit is configured to display the name of the product on the display unit in a state in which the imaging unit acquires the video including the first code and the second code of the product.

7. The privilege display system according to claim 6, wherein
the processing unit is configured to display the name of the product on the display unit according to a predetermined rule.

8. The privilege display system according to claim 7, wherein
the predetermined rule is a display order rule in a case where names of a plurality of products are displayed.

9. The privilege display system according to claim 7, wherein
the predetermined rule is a rule for displaying a name of a specific product retrieved from a plurality of the products.

10. The privilege display system according to claim 2, wherein
the imaging unit is an installed camera, and
the display unit is an installed monitor.

11. The privilege display system according to claim 6, wherein
the first code is a two-dimensional code.

12. The privilege display system according to claim 6, wherein
the second code is an AR marker.

13. The privilege display system according to claim 6, wherein
the first code and the second code are printed on a label attached to the product.

14. A privilege display method comprising:
storing unique product ID information for each product, additional information for each product, and privilege information in association with the product ID information and the additional information, wherein the product ID information includes a set of unique product IDs, each of which corresponds to an individual product so that no identical product IDs exist for the same type of product;
acquiring a video including a code corresponding to the product ID information using an imaging unit;
displaying the video acquired by the imaging unit on a display unit as a real-time moving image;
acquiring, from the video acquired by the imaging unit, the additional information that is associated with the product ID information corresponding to the code;
determining a privilege based on the privilege information stored in association with the acquired additional information; and
displaying a content of the privilege at a predetermined position in the real-time moving image.

15. A non-transitory computer-readable medium storing a program executable by a computer of a privilege display system, wherein the program causes the computer to execute instructions for performing the following operations:
storing unique product ID information for each product, additional information for each product, and privilege information in association with the product ID information and the additional information, wherein the product ID information includes a set of unique product IDs, each of which corresponds to an individual product so that no identical product IDs exist for the same type of product;
acquiring a video including a code corresponding to the product ID information using an imaging unit;
displaying the video acquired by the imaging unit on a display unit as a real-time moving image;
acquiring, from the video acquired by the imaging unit, the additional information that is associated with the product ID information corresponding to the code;
determining a privilege based on the privilege information stored in association with the acquired additional information; and
displaying a content of the privilege at a predetermined position in the real-time moving image.

* * * * *